Dec. 11, 1928.

J. DYKSTRA 1,694,774

SPRING HANGER AND BUMPER SUPPORT

Filed Feb. 17, 1928

Inventor
James Dykstra
By Blackmore, Spencer & Flint
Attorneys

Patented Dec. 11, 1928.

1,694,774

UNITED STATES PATENT OFFICE.

JAMES DYKSTRA, OF LANSING, MICHIGAN, ASSIGNOR TO GENERAL MOTORS CORPORATION, OF DETROIT, MICHIGAN, A CORPORATION OF DELAWARE.

SPRING HANGER AND BUMPER SUPPORT.

Application filed February 17, 1928. Serial No. 255,036.

This invention relates to motor vehicles and more particularly to an improvement in spring hangers and bumper supports.

One of the objects of the invention is to provide a combined spring hanger and bumper support fitting or bracket, which forms a permanent part of the chassis frame, and which may be made from pressed metal so as to be simple in construction and economical in manufacture, and which involves the use of a minimum amount of material and but a few inexpensive and readily performed machining operations.

Other objects and advantages will be apparent from the following specification taken in connection with the accompanying drawing wherein.

Figure 1:
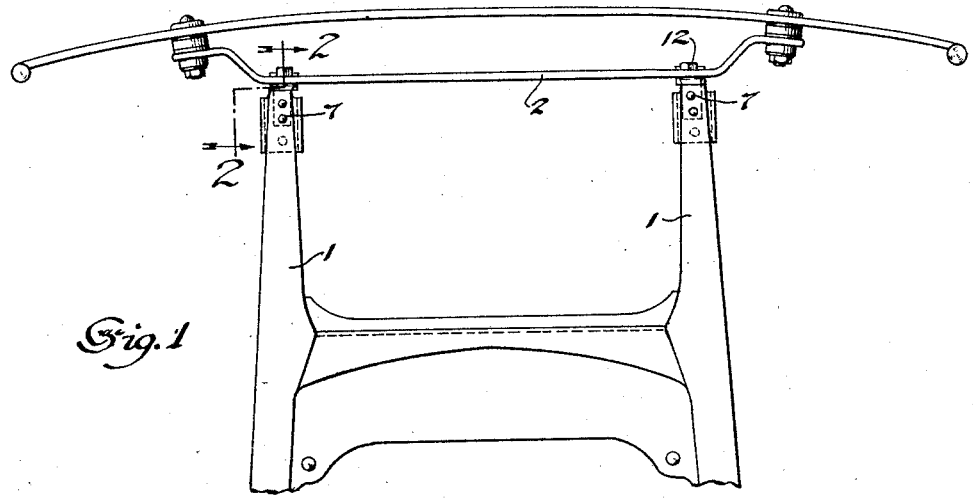
Figure 1 is a fragmentary plan view of a front portion of a chassis frame embodying the present invention.
Figure 2:
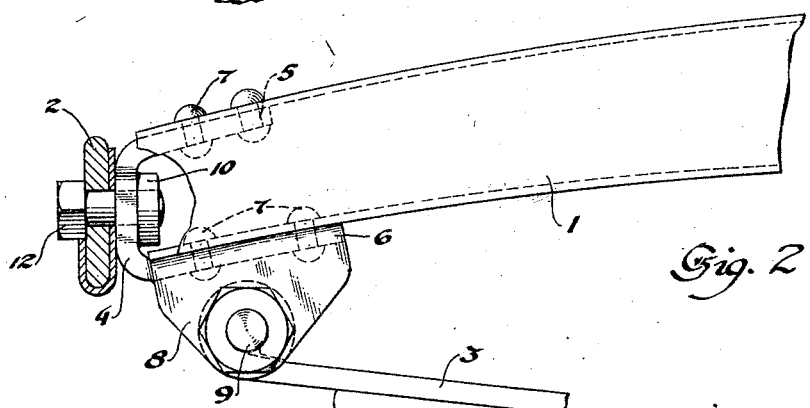
Figure 2 is a view taken on line 2—2 of Figure 1.
Figure 3:
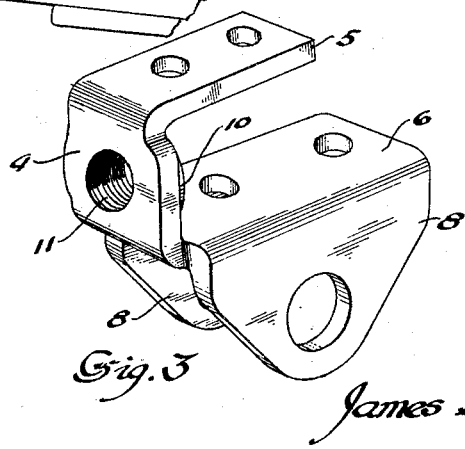
Figure 3 is a detail perspective view of the bracket.

Referring to the accompanying drawing wherein preferred, but not necessarily, the only embodiment of the invention is illustrated, the reference characters 1—1 indicate a pair of longitudinally extending channel shaped side members of a vehicle chassis. 2 indicates a bumper to be supported on the front of the frame and the numeral 3 refers to a semielliptical multi-lead load supporting spring. The thing with which this invention is particularly concerned, consists of a bracket or fitting formed from flat strap metal bent to the desired shape or one formed by stamping or pressing from sheet metal. It includes a substantially vertical face or connecting web portion 4, having at opposite ends, a pair of angularly or laterally extending flanges or feet 5 and 6 respectively, which are adapted to be secured by rivets 7, on the underside of the top and bottom flanges of the channeled frame member. The lowermost foot 6 is provided with a pair of spaced dependent or angular ears 8—8, between which the terminal eye formed on the end of the main leaf of the spring 3, is adapted to be pivotally mounted upon the shackle bolt 9, extending through the eye and aligned openings in the ears 8. On the rear face of the connecting portion 4 there is fixedly secured, as by welding, brazing or the like a washer or body 10, this washer and the web portion 4 being provided with a screw threaded opening or hole 11, into which is threaded the attachment bolt 12 for connecting the bumper thereto.

From the above description it will be apparent, that there is thus provided a combined bumper support and spring hanger bracket which will be of extremely low cost, highly efficient in use, and unlikely to get out of repair. While the invention has been described more or less specifically, it is to be understood that such modifications may be made as come within the scope of the appended claims.

I claim.

1. A fitting formed from sheet metal and adapted to be permanently carried by a frame member, comprising a substantially vertical web for the attachment of a bumper, a pair of feet projecting laterally from opposite ends of the web adapted to extend below and be secured to the upper and lower flange of a channelled frame member, and a pair of spaced dependent ears carried by the lowermost foot between which the end of a vehicle load supporting spring is pivotally secured.

2. A fitting formed from sheet metal and adapted to be permanently carried by a frame member, comprising a substantially vertical web for the attachment of a bumper, a pair of spaced laterally extending feet connected by said web and adapted for attachment to the frame member, and a pair of spaced ears dependent from one of said feet between which a load supporting spring is pivotally mounted.

3. A fitting formed from sheet metal and adapted to be permanently carried by a frame member, comprising a substantially vertical web for the attachment of a bumper, a pair of rearwardly extending flanges for attachment with the frame, and a pair of dependent ears associated with one of said flanges to which a supporting spring is secured.

4. A fitting formed from sheet metal for permanent attachment on the end of a frame member, including a substantially vertically extending flat portion on which a bumper may be mounted a pair of foot portions extending angularly from said flat portion and adapted to be permanently secured to the frame member, and a dependent angular portion on one of said foot portions for the attachment of a vehicle spring.

5. A bracket including a pair of lateral legs adapted for attachment in the top and bottom flanges of a channeled frame member, a connecting cross portion to which a bumper may be secured, and a pair of spaced dependent ears on the lowermost leg for pivotally mounting a vehicle spring.

6. A bracket including a bumper supporting portion having a substantially flat vertical attachment face, pair of integral legs extending angularly therefrom for permanent attachment with a vehicle frame, and a pair of dependent ears extending angularly from one of said legs for connection with a vehicle spring.

7. A bracket including a bumper supporting portion having a substantially flat vertical attachment face, a pair of integral legs extending angularly therefrom for permanent attachment with a vehicle frame, and spring hanger connection associated with one of said legs.

In testimony whereof I affix my signature.

JAMES DYKSTRA.